United States Patent [19]
Duffield et al.

[11] Patent Number: 5,453,796
[45] Date of Patent: Sep. 26, 1995

[54] SIGNAL SWAP APPARATUS FOR A TELEVISION RECEIVER HAVING AN HDTV MAIN PICTURE SIGNAL PROCESSOR AND AN NTSC PIX-IN-PIX SIGNAL PROCESSOR

[75] Inventors: David J. Duffield, Indianapolis; Robert D. Altmanshofer, Carmel, both of Ind.

[73] Assignee: Thomson Consumer Electronics, Inc., Indianapolis, Ind.

[21] Appl. No.: 266,902

[22] Filed: Jun. 28, 1994

[51] Int. Cl.⁶ ............................ H04N 5/45; H04N 5/260; H04N 5/261
[52] U.S. Cl. ..................... 348/565; 348/584; 348/567
[58] Field of Search ................................ 348/563, 564, 348/565, 584, 567; H04N 5/45, 5/260, 5/265

[56]  References Cited

U.S. PATENT DOCUMENTS

| | | | |
|---|---|---|---|
| 4,605,950 | 8/1986 | Goldberg et al. | 358/11 |
| 4,670,783 | 6/1987 | Nadan | 358/141 |
| 4,694,338 | 9/1987 | Tsinberg | 358/141 |
| 5,122,875 | 6/1992 | Raychaudhuri et al. | 358/133 |
| 5,134,464 | 7/1992 | Basile et al. | 358/12 |
| 5,148,272 | 9/1992 | Acampora et al. | 358/133 |
| 5,235,424 | 8/1993 | Wagner et al. | 358/174 |
| 5,287,180 | 2/1994 | White | 348/484 |

OTHER PUBLICATIONS

Sony, KW-3600HD.

Primary Examiner—James J. Groody
Assistant Examiner—Glenton B. Burgess
Attorney, Agent, or Firm—Joseph S. Tripoli; Peter M. Emanuel; Thomas F. Lenihan

[57]  ABSTRACT

A television receiver system having PIP capability includes two NTSC tuners and signal processing arrangements, and an HDTV tuner and signal processing arrangement. In order to accomplish a CHANNEL SWAP function, a controller searches a table for data indicative of pairing of NTSC channels and HDTV channels, the NTSC channel associated with the main channel HDTV source is tuned by the PIP NTSC tuner, and the HDTV channel associated with the PIP NTSC source is tuned by the HDTV tuner. If the inset image has no paired HDTV channel then the second NTSC tuner is controlled to select the channel formerly tuned by the PIP NTSC tuner.

10 Claims, 6 Drawing Sheets

SIGNAL SWAP APPARATUS FOR A TELEVISION RECEIVER HAVING AN HDTV MAIN PICTURE SIGNAL PROCESSOR AND AN NTSC PIX-IN-PIX SIGNAL PROCESSOR

FIELD OF THE INVENTION

The subject invention concerns the field of television receivers, and relates specifically to a television receiver for tuning both NTSC (conventional) signals and HDTV (widescreen high definition digital) signals.

BACKGROUND OF THE INVENTION

The HDTV (digital high definition wide-screen television) system proposed for use in the United States is totally incompatible with the conventional NTSC broadcast standard in use today. Some primary differences between the two systems are: the HDTV system is digital while the NTSC system is analog, the HDTV system uses a 16:9 aspect ratio while the NTSC system has a 4:3 aspect ratio, the HDTV system will have 1125 television scan lines while the NTSC system has only 525. Thus, if the broadcasting industry immediately adopted the digital HDTV system and abandoned the NTSC system, perfectly serviceable NTSC television receivers purchased within the last few years would be rendered obsolete and useless. To avoid such a result, it is currently envisioned that the transition from conventional analog NTSC-standard broadcasts to digital HDTV television broadcasts will occur over a period which may last some fifteen years to allow for normal attrition of the older NTSC television receivers. During this period, television stations will "simulcast" (i.e., simultaneously broadcast) their programs on two television channels allotted for their use by the FCC (Federal Communications Commission). Each of the two channels will encompass 6 MHz of bandwidth, and need not be contiguous. One of the two channels will be the currently assigned analog NTSC channel, and the other will be assigned for transmission of HDTV material.

It is not expected that all television stations will begin broadcasting HDTV signals on the same day. Instead, the television stations in a given geographic area will most probably begin HDTV transmissions over a period of a few weeks, months, or even years, as their individual finances permit. It is envisioned that television receivers produced during the transition period will include both an HDTV tuner and signal processing section, and an NTSC tuner and signal processing section. In this way, the television receiver could receive and display signals of both systems.

As noted above, each television station in a given geographic area will have two channels assigned to it. It is most likely that these channels will not be contiguous, nor even have a nationwide pattern of channel pairing due to the realities of spectrum crowding. That is, there will be no fixed relationship between the NTSC channel number and the HDTV channel number.

Nevertheless, despite that fact that the signals are carried on two distinct frequencies, and are actually incompatible, it is likely that the viewer will come to regard the transmissions as one television channel because the same television program may be carried simultaneously on both channels. That is, a version of a given television program in the NTSC format may be aired on the NTSC channel at the same time that its corresponding version in the HDTV format is aired on the paired HDTV channel of the same television station. The nontechnical viewer, not fully understanding the system distinctions, will naturally expect to tune his desired television program as easily as he has done in the past.

In order to free the viewer from having to remember that NTSC channel 4 (for example) is paired with HDTV channel 41 (for example), a tuning-setup procedure will be provided so that the viewer may specify which channels are paired in his given geographic area.

PIP (i.e., picture-in-picture, or Pix-in-Pix) circuitry is well-known in modern television receivers. In a pix-in-pix system, the television receiver displays a main image and a small inset image. A common feature of PIP television receivers is "Channel Swap". A channel swap feature allows a viewer to change the positions of the two pictures on the screen. The channel swap feature is performed by baseband signal switching circuitry which switch the former inset image signals to the main image processing circuitry, and switch the former main image to the inset image processing circuitry.

A dual-system (i.e., High Definition TV/NTSC) television receiver which also includes PIP circuitry is known from the Sony KW-3600HD television receiver, produced and marketed in Japan by Sony Corporation in 1990. The KW-3600 HD includes circuitry to receive and display NTSC signals and High Definition analog signals (i.e., the MUSE system). The KW-3600HD television receiver is capable of displaying a main picture and a small picture in a variety of modes including a 16:9 HDTV main picture with an NTSC small picture, and an NTSC main picture with an 16:9 HDTV small picture. It is noted that in Japan there are only two MUSE channels, and consequently, they are not "paired" with a corresponding NTSC channel.

As noted above, it is envisioned that television receivers manufactured for use in the United States during the next few years will include both an NTSC tuner and an HDTV tuner. It is reasonable to assume that a dual-system (i.e., HDTV/NTSC) television receiver having PIP capability would restrict the PIP circuitry to process only one of the two systems (i.e., either NTSC signals or HDTV signals) in order to lower the cost to a practical amount. In this regard, it is noted that the KW-3600HD television receiver sold in Japan at a price which was from 20 to 30 times the cost of a conventional console television receiver, and was clearly priced out of the mass market. Unfortunately, if the PIP circuitry were to be designed to process only one of the two systems (i.e., either NTSC signals or HDTV signals), then the act of choosing either of the HDTV system or the NTSC system for the PIP processing circuitry, makes the PIP assembly incompatible with one of the two tuners. In such a case, a problem immediately arises as to how to perform a channel swap feature when the PIP source and the main picture source are on two different and incompatible systems, and when the PIP processing circuitry is limited to operate on only one of the two systems.

SUMMARY OF THE INVENTION

A television receiver system having PIP capability includes first and second tuners and signal processing arrangements for receiving and processing television signals in the NTSC format, and a third tuner and signal processing arrangement for receiving and processing television signals in the HDTV format. The television receiver includes a controller responsive to user input for controlling PIP functions. In response to the entering of a channel swap command, the controller searches a table for data indicative of pairing of NTSC channels and HDTV channels. If the main channel image is from an HDTV source, its associated NTSC channel is tuned by the PIP NTSC tuner. If the inset image is from an NTSC channel having a paired HDTV channel, then the HDTV tuner is controlled to select that HDTV channel. If no HDTV channel is associated with the inset image, then the second (i.e., main) NTSC tuner is controlled to select the NTSC channel formerly tuned by the first (i.e., PIP) NTSC tuner.

In yet another embodiment of the invention, data relating to paired NTSC and HDTV channels is communicated via Extended Data Services (EDS) signals transmitted by a broadcaster during the vertical interval and automatically loaded into the proper areas of RAM in the receiver.

DETAILED DESCRIPTION OF THE EMBODIMENT

Figure 1:
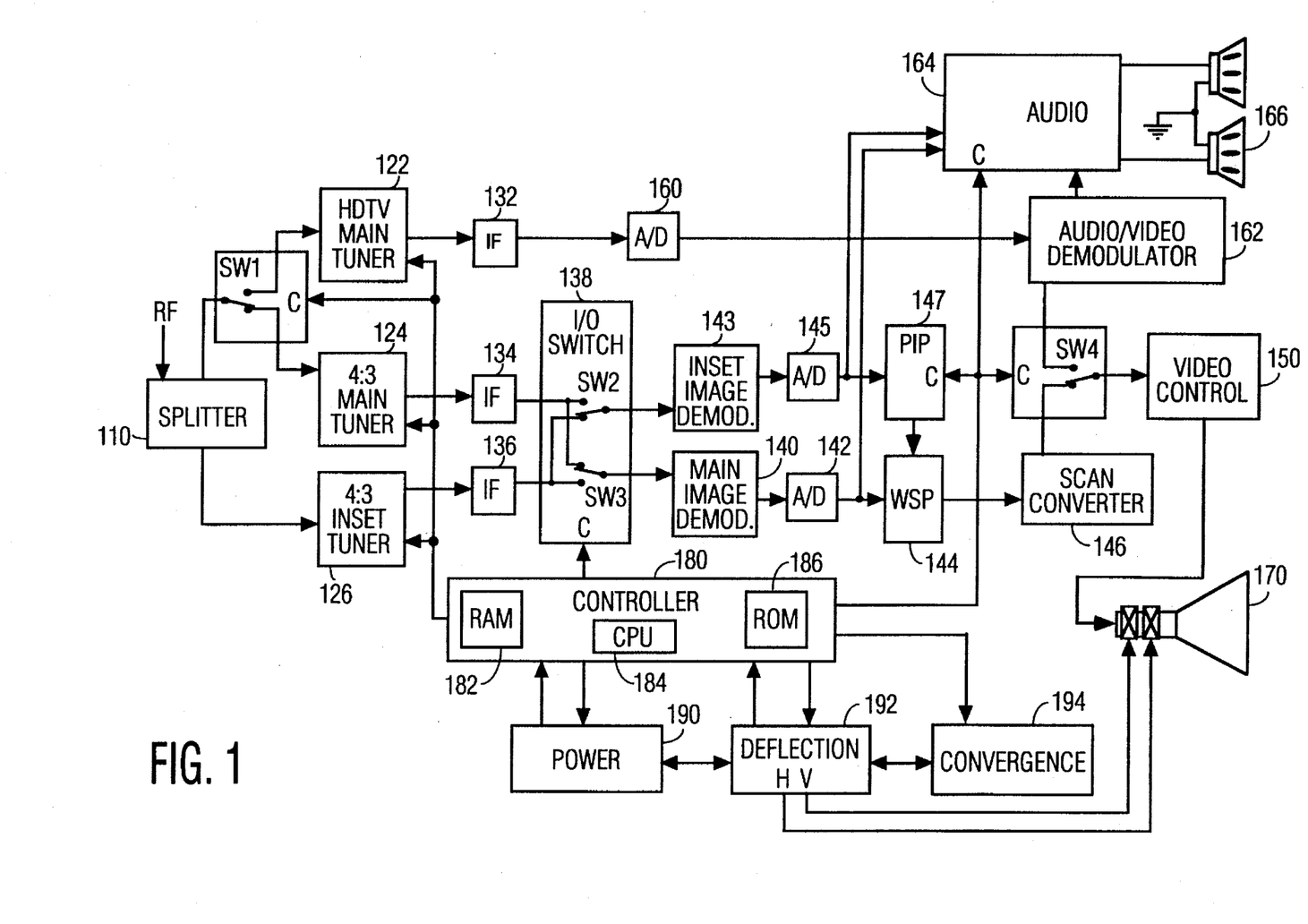
FIG. 1 shows a simplified block diagram of a television receiver suitable for use with the invention.
Figure 2A:
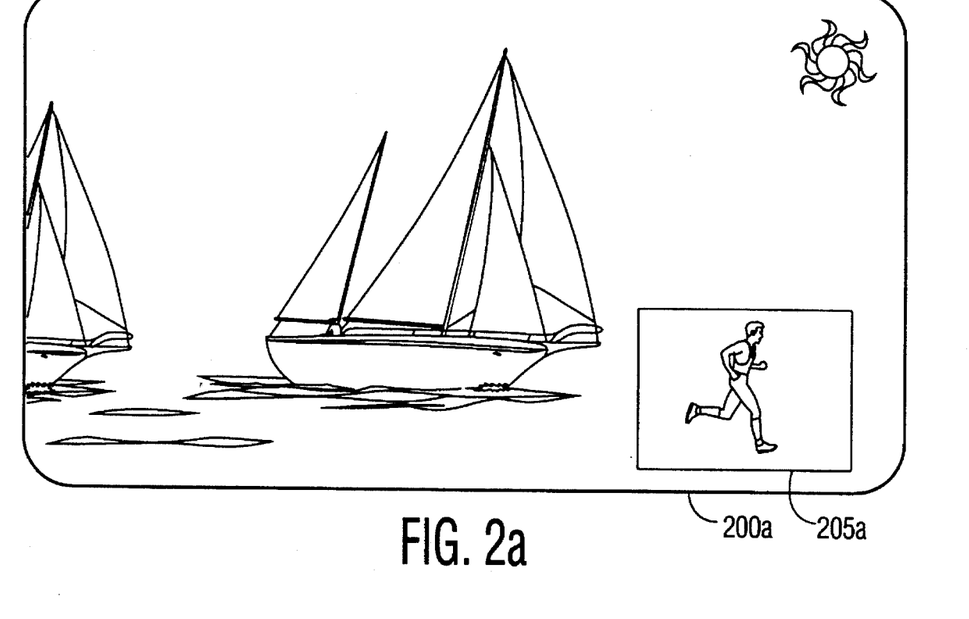
FIGS. 2a and 2b show display screens of a television receiver in accordance with the invention.
Figure 2B:
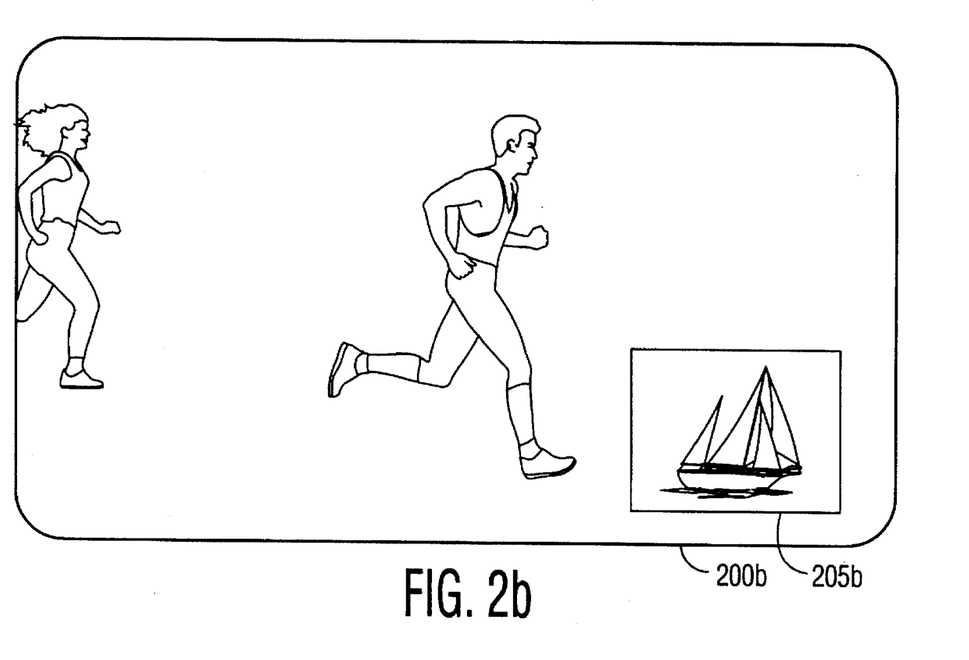

FIG. 1 shows in block diagram form, the circuitry of a dual system television which receives and processes television signals transmitted in both HDTV format and in a conventional format such as NTSC. Such a receiver is equipped with a wide-screen picture tube for displaying HDTV television images in the 16:9 aspect ratio. The receiver of FIG. 1 also includes a PIP processor which is capable of displaying signals in only the conventional 4:3 aspect ratio. This arrangement is advantageous in that it makes use of the NTSC tuner when an HDTV signal is selected for viewing as the main picture. Utilizing an NTSC tuner for the PIP function is also economically advantageous in that HDTV tuners are expected to cost much more than NTSC tuners. The images produced in such a receiver are shown in FIGS. 2a and 2b. In a sense, FIGS. 2a and 2b also illustrate the problem to be solved. For example, if the screen display of FIG. 2a is being displayed when a CHANNEL SWAP command is issued, the desired result is that which is illustrated in FIG. 2b. Note that the main image 200a of FIG. 2a is different from the PIP image 205b of FIG. 2b, and that the main image 200b of FIG. 2b is different than the PIP image 205a of FIG. 2a. In both cases, the main image is a 16:9 widescreen HDTV image and the PIP image is a 4:3 conventional (i.e., NTSC, PAL or SECAM) image. In such a system a simple signal swap without causing a loss of picture information, or causing geometric distortion, is impossible.

In apparatus according to the subject invention, a CHANNEL SWAP command causes the HDTV tuner to tune to the paired channel of the channel which is transmitting the image displayed in the PIP inset, and causes the NTSC PIP tuner to tune to the paired channel of the channel which is transmitting the image displayed in the main picture area of the screen.

With foregoing in mind, the apparatus of FIG. 1, for carrying out the invention, will now be described. RF signals are applied to the input of a signal splitter 110. RF signals from a first output of signal splitter 110 are applied to the wiper of an RF signal switch SW1. RF signal switch SW1 selectively couples RF signals to an HDTV tuner 122 or an NTSC main tuner 124, under control of a controller 180. Splitter 110 also provides RF signals to an NTSC inset tuner 126. All three of the above-mentioned tuners are also controlled by controller 180. Controller 180, includes a RAM (Random Access Memory) 182, a CPU (Central Processing Unit) 184, and a ROM (Read Only Memory) 186. Controller 180 may be a microcomputer, a microprocessor, or a dedicated custom integrated circuit controller. RAM 182 and ROM 186 may be either internal or external to controller 180. Controller 180 also controls other portions of the television receiver which are not particularly relevant to the subject invention, such as a power unit 190, a deflection unit 192, and a convergence assembly 194.

HDTV tuner 122 may be of the type known from U.S. Pat. No. 5,235,424, (Wagner, et al.) issued 10 Aug. 1993, hereby incorporated by reference. HDTV tuner 122, 4:3 (i.e., NTSC) main tuner 124, and 4:3 (NTSC) inset tuner 126, convert their respective received RF signals to an intermediate frequency (IF) and apply the IF signal to a respective IF amplifier 132, 134, or 136. HDTV IF unit 132 amplifies the signals presented to it and applies an amplified IF signal to an A/D (analog-to-digital) converter 160. A/D unit 160 converts the IF signal from the analog domain to the digital domain, and applies the resulting digital signals to an AUDIO/VIDEO DEMODULATOR unit 162. Those skilled in the art will recognize that AUDIO/VIDEO DEMODULATOR unit 162 includes such known sub-blocks as an equalizer, and a transport unit, not shown or discussed in detail because those sub-blocks are not particularly germane to the subject invention. AUDIO/VIDEO DEMODULATOR unit 162 separates video and audio signals, provides video signals to a first input of a video switch SW4, and provides audio signals to one input of an AUDIO amplifier block 164, which demodulates stereo audio signals, amplifies the signals and applies them to a pair of speakers 166.

4:3 main picture IF unit 134 and 4:3 inset picture IF unit 136 are cross-connected to respective poles of an I/O switch arrangement 138 comprising video switches SW2 and SW3 which operate independently of one another under control of controller 180. The wiper (i.e., movable contact) of switch SW2 is connected to the input of an INSET IMAGE DEMODULATOR 143 which converts the IF signal to a baseband 4:3 video signal and applies it to an A/D converter unit 145 for digital conversion. The resulting digital signal is provided to a PIP unit 147 for sampling and storage under control of controller 180. The output of PIP unit 147 is applied to one input of a Wide Screen Processor (WSP) unit 144.

The wiper (i.e., movable contact) of switch SW3 is connected to the input of an MAIN IMAGE DEMODULATOR 140 which converts the IF signal to a baseband NTSC video signal and applies it to an A/D converter unit 142 for digital conversion. The resulting digital signal is provided to the other input of Wide Screen Processor (WSP) unit 144. Wide Screen Processor (WSP) unit 144 converts the received 4:3 NTSC signal into the 16:9 format, or creates a combined image comprising a 4:3 main picture and a POP (picture-outside of-picture) wherein the POP image is supplied by PIP unit 147. The output of Wide Screen Processor (WSP) unit 144 is applied to a SCAN CONVERTER unit 146 for conversion to HDTV scan rates.

The output of SCAN CONVERTER unit 146 is applied to one input of video switch SW4. Switch SW4 operates under control of controller 180, and selects one of the two signals at its inputs for application to VIDEO CONTROL unit 150 for amplification. VIDEO CONTROL unit 150 applies the amplified signal to the input terminals of a display device 170. Of course, display device 170 may be a picture tube, a set of projection tubes, or an LCD (Liquid crystal display) device.

AUDIO unit 164 operates under control of controller 180, and includes audio selection circuitry for selecting the proper audio signal which accompanies the main image. In this regard, AUDIO unit 164 has a second input for receiving AUDIO signals associated with the main NTSC signal, and a third input for receiving audio signals associated with the inset NTSC signal.

POWER SUPPLY unit 190, includes both standby and operating power supplies. DEFLECTION unit 192 provides horizontal (H) and vertical (V) deflection signals, and CONVERGENCE unit 194 controls proper registration of the R, G, and B, color signals on display device 170.

The operation of a "channel swap" feature according to the subject invention will be described with reference to FIGS. 2a and 2b, the flowchart of FIG. 3, and the memory arrangement of FIG. 4. In FIG. 2a, a 16:9 HDTV image of a yacht race is received and displayed as the main image 200a, and a 4:3 NTSC image of a foot race is received and displayed as an inset image 205a. The problem to be solved is exactly how should these two images be swapped to produce the display of FIG. 2b, given that the images are in totally different formats.

Figure 3:
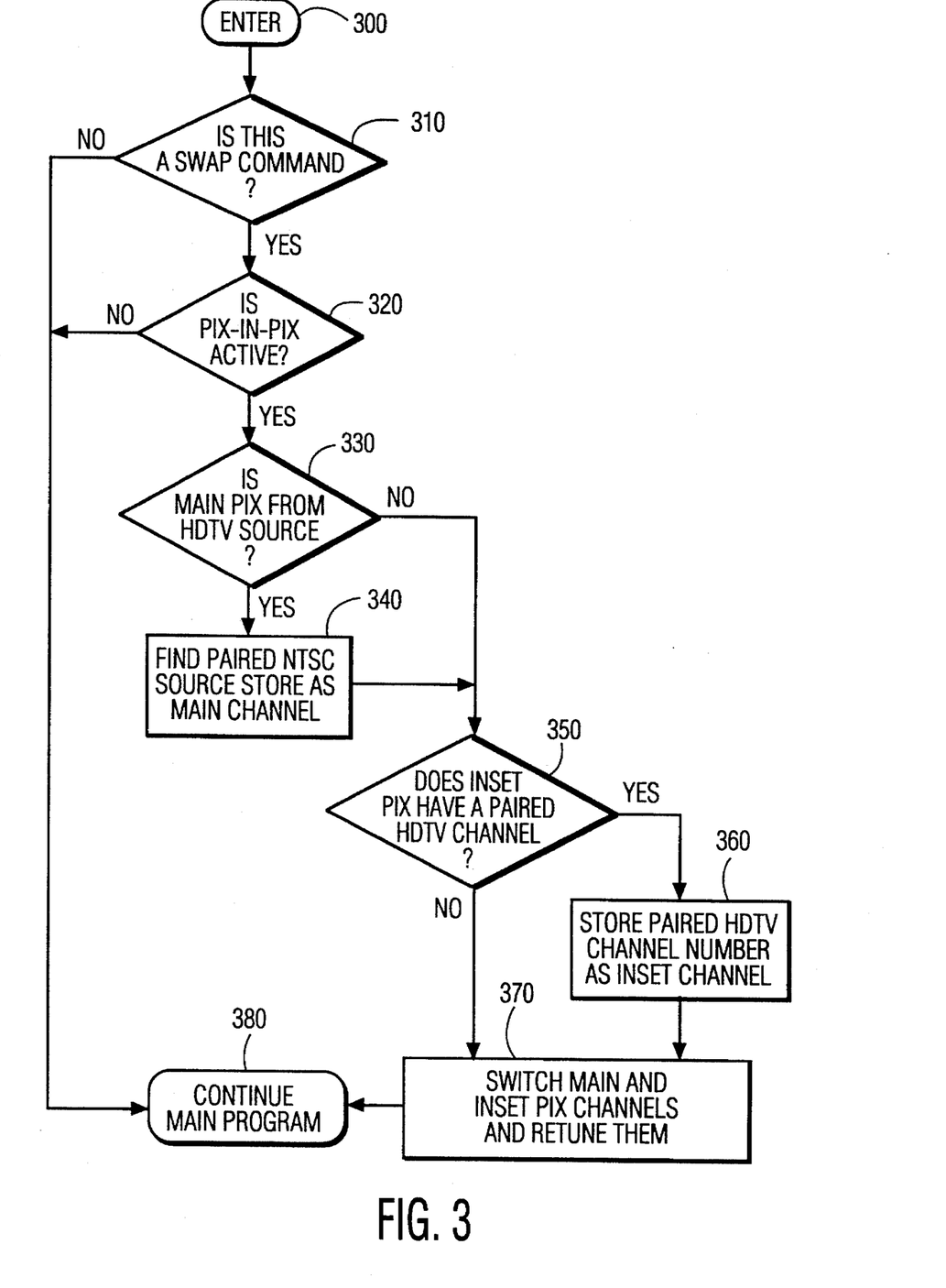
FIG. 3 is an illustration of a flowchart showing the relevant portion of the control program for the controller of FIG. 1.

The "SWAP" is accomplished by use of that portion of the control program of controller 180 which is illustrated in FIG. 3. Step 300 is entered upon receiving a command from a remote control unit (not shown). At step 310, the command is examined to determine if it is a swap command. If not, the routine is exited at step 380. If it is a swap command, the pix-in-pix circuitry is checked at step 320 to see if it is active. If not, the routine is exited at step 380. If so, controller 180 determines at step 330, if the main image is from an HDTV source. If it is, (as shown in FIG. 2a), a search is made of memory to find its paired channel.

Figure 4:
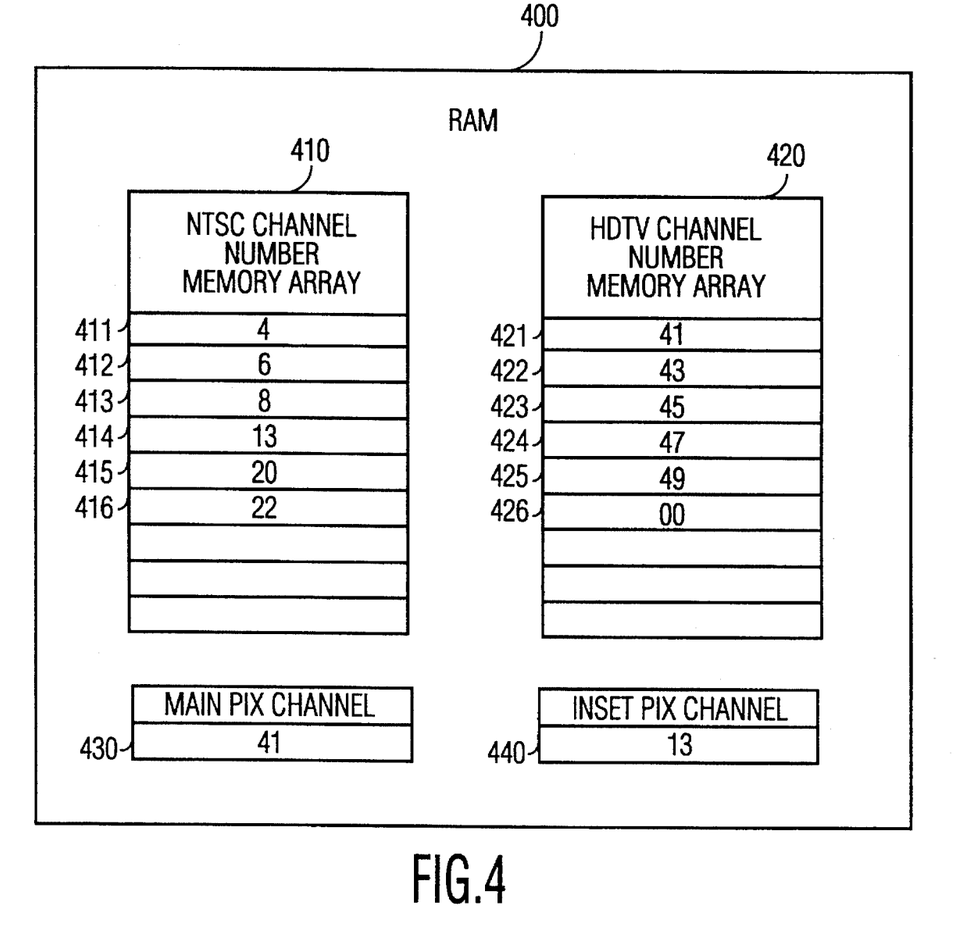
FIG. 4 shows a simplified block diagram of a portion of the memory circuitry of the controller of FIG. 1.

Turning for a moment to FIG. 4, a memory array 400 is shown comprising four portions 410-440. Portion 410 stores in locations 411-416 NTSC channel numbers entered by a user either directly or via an autoprogramming mode. Portion 420 stores in locations 421-426 HDTV channel numbers entered by a user. The channel numbers may be stored such that, for example, the HDTV channel number in location 421 is paired with, or corresponds to, the NTSC channel number stored in location 411. Note that location 426 contains the code 00, a nonexistent channel number, indicating that NTSC channel 22 has no paired HDTV channel at this time. Memory location 430 holds the channel number of the currently-tuned main picture, and memory location 440 holds the channel number of the currently-tuned inset image. The above-described memory array is only one of many programming techniques which may be used to associate an NTSC channel and an HDTV channel, others may be variations of tree structures, or simply pointers to specific areas where the data may be found. The invention is not intended to be limited to the type of data structure used.

In the present example, the main (i.e., HDTV) picture is received from channel 41, and the inset (i.e., NTSC) picture is received from channel 13. At step 340 of FIG. 3, controller 180 examines memory location 430, finds that HDTV channel 41 is stored in location 421, and determines that channel 4 (stored in memory location 411) is its paired NTSC channel. Channel 4 is then temporarily written into the main picture channel memory location 430. At step 350, a check is made to see if the inset NTSC picture has a paired HDTV channel. That is controller 180 checks memory location 440 and finds that NTSC channel 13 is stored in memory location 414, and checks memory location 424 to determine that channel 47 is the paired channel. At step 360, channel 47 is then temporarily written into inset picture channel memory 440. At step 370, the values in memory locations 430 and 440 are switched, and tuners 122 and 126 are tuned accordingly. The result of this procedure is shown in FIG. 2b, and to a viewer appears to be a simple image swap, when, in fact, it was actually a retuning of each of two tuners. In the event that there is no paired HDTV channel, then switch SW1 would be switched to apply signal to NTSC main tuner 124, and main NTSC tuner 124 would be activated to tune to the channel formerly displayed in the inset.

Figure 5A:
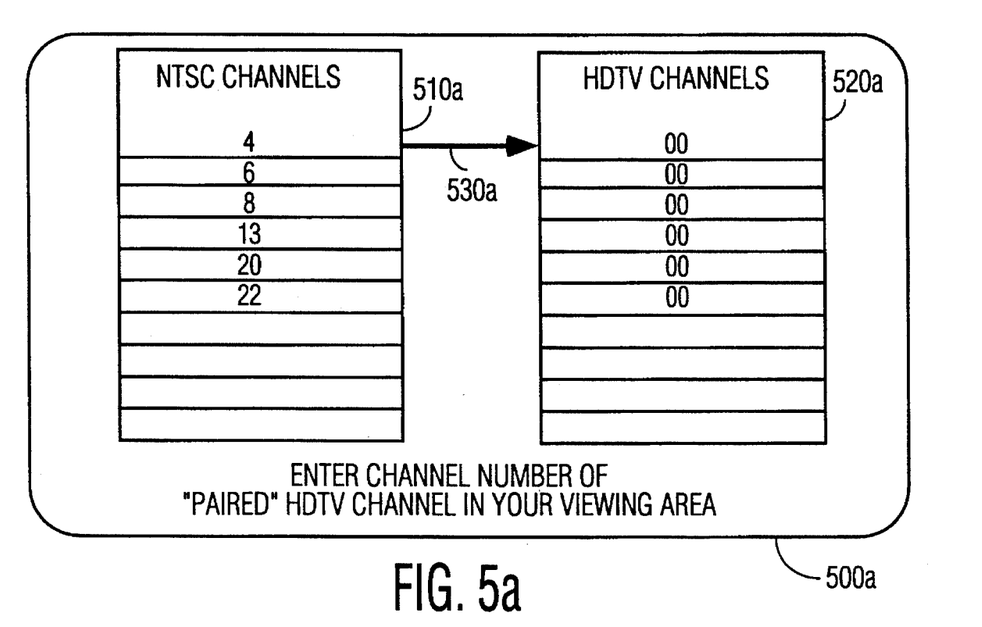
FIGS. 5a and 5b are illustrations of a 16:9 display screen showing a list for entering channel pairing information.
Figure 5B:
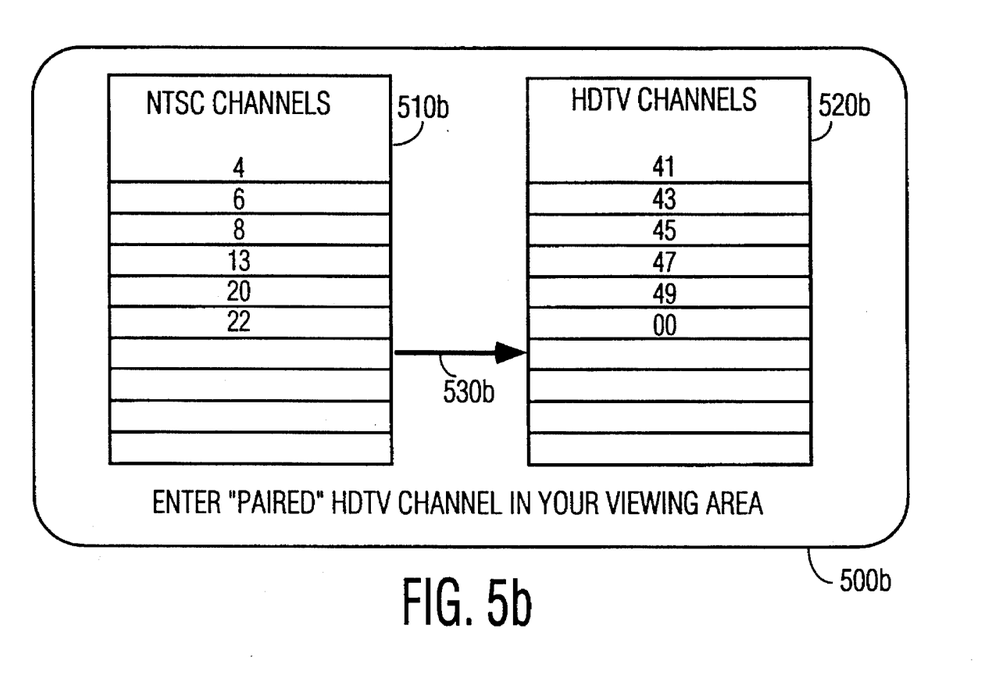

FIGS. 5a and 5b show a list for entering the data associating NTSC channels with counterpart HDTV channels. In FIG. 5a a display screen 500a shows an NTSC channel list 510a and an HDTV channel list 520a. The NTSC channel list 500a includes channel data which may have been automatically entered via an autoprogramming function. The HDTV channel list is empty of useful channel information, containing only the code 00 in each location. A cursor 530a, in combination with the text message at the bottom of the screen, indicates that the user is to enter the HDTV channel number for the HDTV channel in his local viewing area which corresponds to NTSC channel 4. Thus, FIG. 5a illustrates the way the lists would look when the user begins his initial setup procedure, and FIG. 5b shows the way the lists would look when the user has finished entering the data for corresponding HDTV channels. Note that the HDTV list location corresponding to NTSC channel 22 still contains the code 00 indicating that channel 22 in this example has no corresponding HDTV "paired" channel. Elements of FIG. 5b having similar reference numerals to those of FIG. 5a serve the same purpose and will not be described again.

Figure 6:
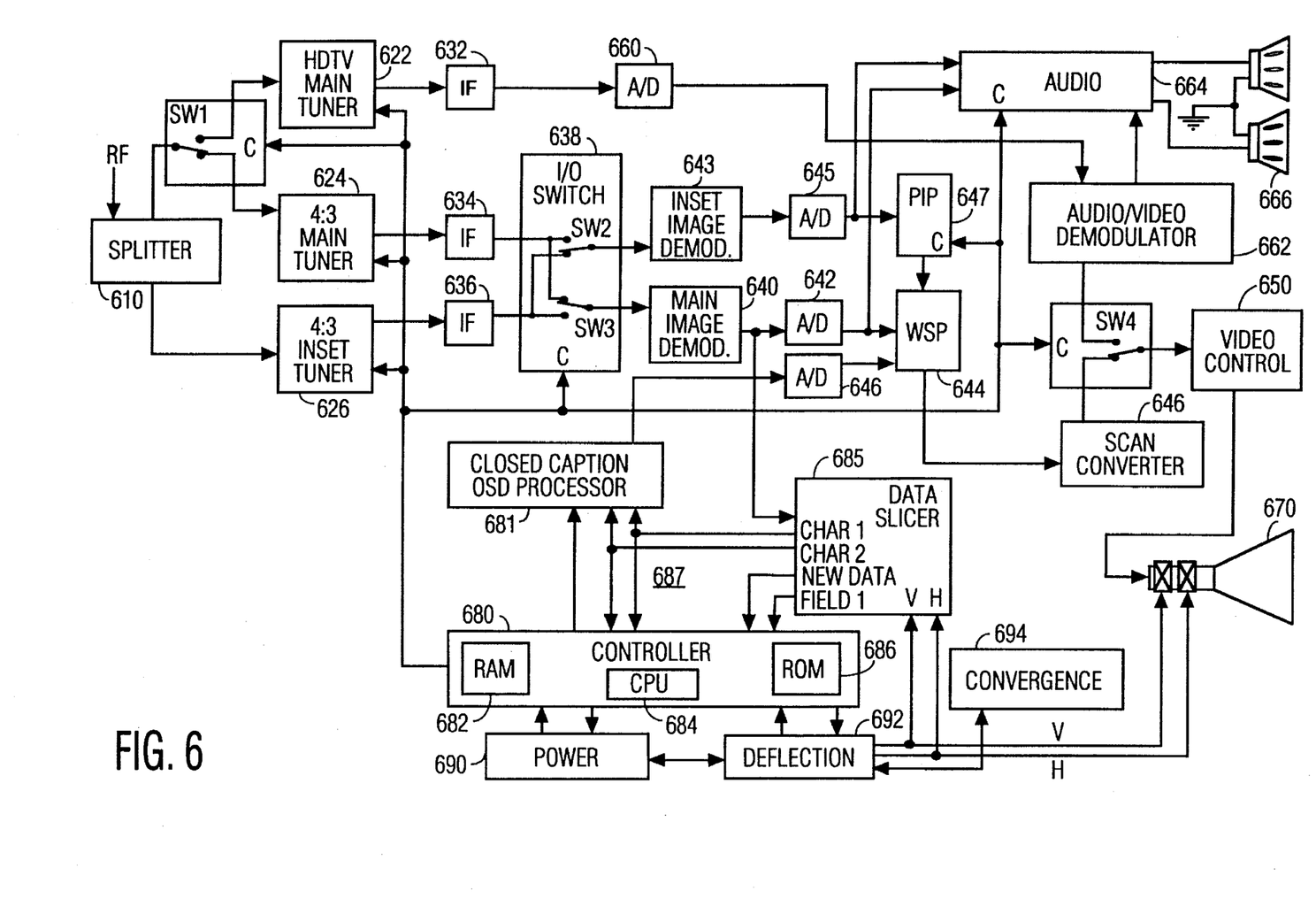
FIG. 6 shows a simplified block diagram of a television receiver suitable for use with another embodiment of the invention.

Alternatively, the "paired channel" data can be sent via the Extended Data Services (EDS) signal, now being transmitted during the vertical interval of some television programs, and can automatically be loaded into memory. Apparatus for accomplishing this task is shown in FIG. 6. Elements in FIG. 6 bearing similar reference numerals to elements of FIG. 1 serve the same function and will not be described again. Referring to FIG. 6, a DATA SLICER unit 685 receives a composite video signal including closed caption or EDS data from demodulator 640. Data slicer 685 separates the EDS data from the video signal and supplies it to controller 680 and a Closed Caption OSD Processor unit 681 via a conductor array, generally designated 687. Output signals of Closed Caption OSD Processor unit 681 are applied via A/D converter unit 646 to Wide Screen Processor (WSP) unit 644 for display on the display screen of the receiver. EDS data concerning paired HDTV and NTSC channels are identified by controller 680 and loaded into the appropriate tables in RAM 440. In this way the user is relieved of the task of entering the corresponding HDTV channel numbers during a setup procedure. The term "controller", as used herein, is intended to include microprocessors, microcomputers, dedicated control integrated circuits, and the like.

Although NTSC format signals are explicitly mentioned in the examples in the specification, the subject invention is also equally applicable to PAL or SECAM format television signals, and the term "conventional television signals", as used herein, is intended to include all television signals systems currently used to produce a 4:3 aspect ratio image.

Although a 16:9 main image and a 4:3 inset image is explicitly mentioned in the disclosed embodiment, one skilled in the art will immediately recognize that the same problem arises if the main image is 4:3 and the inset image is 16:9, and the scope of the following claims is intended to encompass such a situation.

Although a PIP image is disclosed in the described embodiment, one skilled in the art will know that a POP or a cropped side-by-side display of the images is equally possible, and such displays are intended to be within the scope of the invention.

What is claimed is:

1. A television receiver, comprising:

a conventional tuner and signal processing arrangement for receiving and processing a television signal in a conventional format, and having an output at which said television signal of said conventional format is developed, said conventional tuner being responsive to a first control signal;

an HDTV tuner and signal processing arrangement for receiving and processing a television signal in an HDTV format, and having an output at which said television signal of said HDTV formal is developed, said HDTV tuner being responsive to a second control signal;

user-operable data input circuitry adapted to receive user-entered data or commands;

a controller responsive to said user-entered data or commands for generating said first and second control signals;

memory circuitry coupled to said controller for storing data indicative of a pairing of a first television channel broadcasting in said HDTV format with a first television channel broadcasting in a conventional format, and a second television channel broadcasting in said HDTV format with a second television channel broadcasting in said conventional format;

a picture-in-picture processor having an input coupled to said output of said conventional tuner and having an output at which picture-in-picture video signals are generated; and a further video processing unit for receiving said television signal in said HDTV format and for receiving said picture-in-picture video signals and producing a combined signal which when displayed on a display screen causes the display of a main image in HDTV format and an inset image in said conventional format;

said controller, in response to the entering of a channel swap command via said user-operable data input circuitry when said first HDTV channel is tuned by said HDTV tuner for providing said main image and said second conventional television channel broadcasting in a said conventional format channel is tuned by said conventional tuner for providing said inset picture, causes tuning of said second HDTV channel for providing said main image and causes tuning of said first conventional channel for providing said inset picture.

2. The television receiver of claim 1 wherein, said conventional tuner is an NTSC tuner.

3. The television receiver of claim 1 wherein, said conventional tuner is a PAL tuner.

4. The television receiver of claim 1 wherein, said conventional tuner is a SECAM tuner.

5. A television receiver, comprising:

first and second conventional tuners and signal processing arrangements for receiving and processing television signals in a conventional format, each of said first and second conventional tuners having an output at which said television signal of said conventional format is developed, said first conventional tuner being responsive to a first control signal and said second conventional tuner being responsive to a second control signal;

a third HDTV tuner and signal processing arrangement for receiving and processing a television signal in an HDTV format, and having an output at which said television signal of said HDTV format is developed, said HDTV tuner being responsive to a third control signal;

user-operable data input circuitry adapted to receive user-entered data or commands;

a controller responsive to said user-entered data or commands for generating said first, second and third control signals;

memory circuitry coupled to said controller for storing data indicative of a pairing of a television channel broadcasting in said HDTV format with a television channel broadcasting in said conventional format;

a picture-in-picture processor having an input coupled to said output of said second conventional tuner and having an output at which picture-in-picture video signals are generated;

said controller, in response to the entering of a channel swap command via said user-operable data input circuitry, searches said data indicative of pairing of HDTV channels and conventional channels, and said controller, upon determining that a currently displayed main channel image is received from an HDTV source, stores data indicative of the associated conventional channel of said HDTV channel in a PIP-related memory location, or upon determining that said main channel image is not received from an HDTV source, stores data indicative of said conventional channel tuned by said second conventional tuner in a PIP-related memory location, said controller, upon determining that said inset image is received from a conventional channel having a paired HDTV channel, stores data indicative of said paired HDTV channel in a main-picture-related memory location, and said controller, upon determining that said inset image is not received from a conventional channel having a paired HDTV channel, stores data indicative of said conventional channel in a main-picture-related memory location, and causes tuning of said main picture in accordance with said data stored in said main-picture-related memory location, and causes tuning of said inset image in accordance with said data stored in said PIP-related memory location.

6. The television receiver of claim 5 wherein, said first and second conventional tuners are NTSC tuners.

7. The television receiver of claim 5 wherein, said first and second conventional tuners are PAL tuners.

8. The television receiver of claim 5 wherein, said first and second conventional tuners are SECAM tuners.

9. A television receiver, comprising:

a first tuner and signal processing arrangement for receiving and processing a television signal in a first format, and having an output at which said television signal of said first format is developed, said first tuner being responsive to a first control signal;

a second tuner and signal processing arrangement for receiving and processing a television signal in a second format, and having an output at which said television signal of said second format is developed, said second tuner being responsive to a second control signal;, said first and second formats being mutually incompatible;

user-operable data input circuitry adapted to receive user-entered data or commands;

a controller responsive to user-entered data or commands for generating said first and second control signals;

memory circuitry coupled to said controller for storing data indicative of a pairing of a first television channel broadcasting in said first format with a first television channel broadcasting in said second format, and a second television channel broadcasting in said first format with a second television channel broadcasting in said second format;

a picture-in-picture processor having an input coupled to said output of said second tuner and having an output at which picture-in-picture video signals are generated; and a further video processing unit for receiving said television signal in said second format and for receiving said picture-in-picture video signals and producing a combined signal which when displayed on a display screen causes the display of a main image in first format and an inset image in said second format;

said controller, in response to the entering of a channel swap command via said user-operable data input circuitry when said first television channel broadcasting in said first format is tuned by said first tuner for providing said main image and said second television channel broadcasting in said second format is tuned by said second tuner for providing said inset image, causes tuning of said second television channel broadcasting in said first format for providing said main image and said first television channel broadcasting in said second format for providing said inset image.

10. A television receiver, comprising:

an HDTV tuner and signal processing circuitry for receiving and processing HDTV television signals, and having an output at which said HDTV television signals are developed, said HDTV tuner being responsive to a first control signal;

a conventional tuner and signal processing circuitry for receiving and processing for receiving conventional television signals, and having an output at which said conventional television signals are developed, said conventional tuner being responsive to a second control signal;

user-operable data input circuitry adapted to receive user-entered data or commands;

a controller responsive to said user-entered data or commands for generating said first and second control signals;

memory circuitry coupled to said controller for storing data indicative of a pairing of a first HDTV television channel with a first conventional television channel, and a second HDTV television channel with a second conventional television channel;

a picture-in-picture processor having an input coupled to said output of said conventional tuner and having an output at which picture-in-picture video signals are generated;

circuitry having an output coupled to said controller, for receiving and processing auxiliary data transmitted during synchronizing portions of said conventional television signals, said auxiliary data being indicative of the availability of an associated HDTV channel; and a switch having a first input coupled to receive conventional video signals and a second input coupled to receive HDTV video signals, said switch selecting signals at one of said inputs in response to said control signals, and coupling a selected signal to an output;

a further video processing unit having an input coupled to said HDTV tuner for receiving said HDTV television signal and having an input coupled to said output of said switch for receiving said picture-in-picture video signals and producing a combined signal which when displayed on a display screen causes the display of a main image in HDTV format and an inset image in said conventional format;

said controller, in response to the entering of a channel swap command via said user-operable data input circuitry when said first HDTV television channel is tuned by said HDTV tuner for providing said main image and said second conventional television channel is tuned by said conventional tuner for providing said inset image, and in response to said auxiliary data indicating availability of an HDTV channel associated with said second conventional channel, searches said memory circuitry, and retrieves a channel number of said second HDTV television channel and causes tuning of said second HDTV television channel for providing said main image and causes tuning of said first conventional television channel for providing said inset image;

said controller, in response to the entering of a channel swap command via said user-operable data input circuitry and in response to said auxiliary data indicating nonavailability of an HDTV channel associated with said second conventional television channel, causes tuning of said second conventional television for providing said main image and causes tuning of said first conventional television channel for providing said inset image.

* * * * *

UNITED STATES PATENT AND TRADEMARK OFFICE
CERTIFICATE OF CORRECTION

PATENT NO. : 5,453,796
DATED : Sep. 26, 1996
INVENTOR(S) : Duffield, et al.

It is certified that error appears in the above-identified patent and that said Letters Patent is hereby corrected as shown below:

On the title page,
Under [56] References Cited, U.S. PATENT DOCUMENTS, insert the following:

| | | | |
|---|---|---|---|
| 4,878,117 | 10/89 | Ikehira et al. | 348/565 |
| 5,065,243 | 11/91 | Katagiri | 348/565 |
| 5,083,205 | 1/92 | Arai | 348/565 |
| 5,130,800 | 7/92 | Johnson et al. | 348/564 |

Signed and Sealed this

Thirtieth Day of April, 1996

Attest:

BRUCE LEHMAN

Attesting Officer   Commissioner of Patents and Trademarks